(12) United States Patent
Khalil et al.

(10) Patent No.: US 7,342,914 B1
(45) Date of Patent: Mar. 11, 2008

(54) GENERALIZED LINK LAYER ADDRESS EXTENSION

(75) Inventors: Mohamed Khalil, Murphy, TX (US); Haseeb Akhtar, Garland, TX (US); Emad A. Qaddoura, Plano, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 806 days.

(21) Appl. No.: 09/992,252

(22) Filed: Nov. 16, 2001

(51) Int. Cl.
*H04J 3/24* (2006.01)
(52) U.S. Cl. ..................... 370/349; 370/392
(58) Field of Classification Search ........... 370/389, 370/392, 328, 331, 352, 349, 475
See application file for complete search history.

(56) References Cited

U.S. PATENT DOCUMENTS 6,389,023 B1 * 5/2002 Matsuzawa et al. ... 370/395.31
6,791,982 B2 * 9/2004 Westberg ............... 370/392
6,804,221 B1 * 10/2004 Magret et al. .......... 370/338
6,845,091 B2 * 1/2005 Ogier et al. ............. 370/338

OTHER PUBLICATIONS

Solomon, James D.; Mobile IP: The Internet Unplugged; 31-32, 42-45, 247-273; PTR Prentice Hall (1998).
Calhoun, P. and C. Perkins; "RFC 2794: Mobile IP Network Access Identifier Extension for IPv4"; Network Working Group (Mar. 2000).
Aboba, B. and M. Beadles; "RFC 2486: The Network Access Identifer"; Network Working Group (Jan. 1999).

* cited by examiner

*Primary Examiner*—Wing Chan
*Assistant Examiner*—Anthony Sol
(74) *Attorney, Agent, or Firm*—Hemingway & Hansen, LLP; D. Scott Hemingway

(57) ABSTRACT

The present invention supports a generalized link-layer address extension for an information packet transmission on an IP mobility system. In the invention, a link-layer address for a node can be communicated in any information packet rather than confined to a specialized message format. The link-layer address can be used in link-layer routing protocols to simplify mobile IP hand-offs and routing, reducing overhead data traffic and allowing more efficient use of network resources.

20 Claims, 3 Drawing Sheets

GENERALIZED LINK LAYER ADDRESS EXTENSION

TECHNICAL FIELD OF THE INVENTION

A modified address extension for use in a packet-based mobile communication system.

BACKGROUND OF THE INVENTION

Present-day Internet communications represent the synthesis of technical developments begun in the 1960s. During that time period, the Defense Department developed a communication system to support communication between different United States military computer networks, and later a similar system was used to support communication between different research computer networks at United States universities.

The Internet

The Internet, like so many other high tech developments, grew from research originally performed by the United States Department of Defense. In the 1960s, Defense Department officials wanted to connect different types of military computer networks. These different computer networks could not communicate with each other because they used different types of operating systems or networking protocols.

While the Defense Department officials wanted a system that would permit communication between these different computer networks, they realized that a centralized interface system would be vulnerable to missile attack and sabotage. To avoid this vulnerability, the Defense Department required that the interface system be decentralized with no vulnerable failure points.

The Defense Department developed an interface protocol for communication between these different network computers. A few years later, the National Science Foundation (NSF) wanted to connect different types of network computers located at research institutions across the country. The NSF adopted the Defense Department's interface protocol for communication between the research computer networks. Ultimately, this combination of research computer networks would form the foundation of today's Internet.

Internet Protocols

The Defense Department's interface protocol was called the Internet Protocol (IP) standard. The IP standard now supports communication between computers and networks on the Internet. The IP standard identifies the types of services to be provided to users and specifies the mechanisms needed to support these services. The IP standard also describes the upper and lower system interfaces, defines the services to be provided on these interfaces, and outlines the execution environment for services needed in this system.

A transmission protocol, called the Transmission Control Protocol (TCP), was developed to provide connection-oriented, end-to-end data transmission between packet-switched computer networks. The combination of TCP with IP (TCP/IP) forms a system or suite of protocols for data transfer and communication between computers on the Internet. The TCP/IP standard has become mandatory for use in all packet switching networks that connect or have the potential for utilizing connectivity across network or sub-network boundaries.

A computer operating on a network is assigned a unique physical address under the TCP/IP protocols. This is called an IP address. The IP address can include: (1) a network ID and number identifying a network, (2) a sub-network ID number identifying a substructure on the network, and (3) a host ID number identifying a particular computer on the sub-network. A header data field in the information packet will include source and destination addresses. The IP addressing scheme imposes a sensible addressing scheme that reflects the internal organization of the network or sub-network. All information packets transmitted over the Internet will have a set of IP header fields containing this IP address.

A router is located on a network and is used to regulate the transmission of information packets into and out of computer networks and within sub-networks. Routers are referred to by a number of names including Home Agent, Home Mobility Manager, Home Location Register, Foreign Agent, Serving Mobility Manager, Visited Location Register, and Visiting Serving Entity. A router interprets the logical address of an information packet and directs the information packet to its intended destination. Information packets addressed between computers on the sub-network do not pass through the router to the greater network, and as such, these sub-network information packets will not clutter the transmission lines of the greater network. If an information packet is addressed to a computer outside the sub-network, the router forwards the packet onto the greater network.

The TCP/IP network includes protocols that define how routers will determine the transmittal path for data through the network. Routing decisions are based upon information in the IP header and entries maintained in a routing table. A routing table possesses information for a router to determine whether to accept the communicated information packet on behalf of a destination computer or pass the information packet onto another router in the network or sub-network. The routing table's address data enables the router to accurately forward the information packets.

The routing table can be configured manually with routing table entries or with a dynamic routing protocol. In a dynamic routing protocol, routers update routing information with periodic information packet transmissions to other routers on the network. This is referred to as advertising. The dynamic routing protocol accommodates changing network topologies, such as the network architecture, network structure, layout of routers, and interconnection between hosts and routers. Internet Control Message Protocol (ICMP) information packets are used to update routing tables with this changing system topology.

The IP-Based Mobility System

The Internet protocols were originally developed with an assumption that Internet users would be connected to a single, fixed network. With the advent of portable computers and cellular wireless communication systems, the movement of Internet users within a network and across network boundaries has become common. Because of this highly mobile Internet usage, the implicit design assumption of the Internet protocols has been violated.

In an IP-based mobile communication system, the mobile communication device (e.g. cellular phone, pager, computer, etc.) is called a mobile node. Typically, a mobile node changes its point of attachment to a foreign network while maintaining connectivity to its home network. A mobile node may also change its point of attachment between sub-networks in its home network or foreign network. The mobile node will always be associated with its home network and sub-network for IP addressing purposes and will have information routed to it by routers located on the home and foreign network.

IP Mobility Protocols

During the formative years since the Internet was first established, Internet Protocol version 4 (IPv4) was recognized and adopted as the standard version of the Internet Protocol. With the advent of mobile IP and proliferation of computers and computer systems linked to the Internet, various limitations in the IPv4 standard and associated procedures have developed and emerged. In response, new standards are evolving and emerging.

The most pressing limitation in the IPv4 standard is the restriction on the number of possible IP addresses imposed by the 32-bit address field size. Newer standards increase the size of the available address space 400% to 128 bits, which vastly increases the number of available addresses. While the 32-bit address field provides $2^{32}$ or approximately 4 billion IP address possibilities, a 128-bit field provides $2^{128}$ IP address possibilities.

A number of benefits emerge from this vastly larger available address field. First, there is little chance of exhausting the number of IP addresses. Second, a large address field allows aggregation of many network-prefix routers into a single network-prefix router. Finally, the large address pool allows nodes to auto configure using simple mechanisms.

IP Mobility Care-of Addressing

In a mobile IP network, nodes will transmit notification and discovery information packets onto the network to advertise their presence on the network and solicit advertisements from other nodes. While on a foreign network, a mobile node will be assigned a care-of address that will be used to route information packets to the foreign network and the attached mobile node. An advertisement from a router on the foreign network will inform a mobile node that it is attached to a foreign network. The mobile node will typically obtain a care-of address from a router on the foreign network, which it will transmit to its home network in an information packet.

Information packets addressed to the mobile node on the home network will be encapsulated with the care-of address. This information packet will then be forwarded and routed to the mobile node on the foreign network by a router on the foreign network.

Mobile IP Extensions

Extensions have been defined in the EP protocol, and extensions can be used in similar protocols, to support transmission of variable amounts of data in an information packet. This includes address information for mobile nodes, routers, and networks. The extension mechanism in IP permits appropriate addressing and routing information to be carried by any information packet, without restriction to dedicated message types such as discovery, notification, control, and routing information packet formats.

The general extension format is found in FIG. 1 in a Type-Length-Value format. As shown in FIG. 1, the Type data field (T) 1 occupies the first 8-bits (one octet) of the general extension. The value of this data field will designate the type of extension. The Length data field (L) 2 occupies the next 8-bits of the extension, and the value assigned is the length of the Value field (V) 3 in octets. The Value data field 3 occupies the remaining bits in the general extension as specified by the Type 1 and Length 2 data values.

Link Layer Address

There are seven protocol layers in computer systems. These layers include the physical, data link, network, transport, session, presentation, and application layers. Nodes attached to a sub-network or network have an actual physical location on that sub-network or network. The data link-layer is this physical communication link. Generally, all nodes on the same link-layer share the same router and can be referred to as neighboring nodes. When transmitting information packets across a network boundary, IP network-layer protocols are utilized. When transmitting data on the same network link, a link-layer protocol can be used.

A mobile node on its home network will be associated with a specific IP address. As a mobile node moves within its home network, its IP address will remain the same, but its link-layer connectivity will change. A link-layer address represents the link-layer connectivity, which is the actual physical connection between the mobile node and the network. This IP address association with a link-layer address is maintained in data tables on the network.

Routers on the network will maintain the link-layer address and IP address association for a mobile node on a data table, ensuring that information packets can be routed to a mobile node on the correct link-layer connection. This can also occur on a foreign network, where as a mobile node changes link-layer connectivity, routers update the link-layer address association for a mobile node in a data table.

At the link-layer protocol level, a frame, consisting of a small data link-layer address header plus a network-layer information packet, is moved from one computer to another computer on the link. To move an IP information packet from one node to the next node on a link, the link-layer address must be known to transmit the packet within a link-layer frame. To determine which link-layer address corresponds to a given IP address, an Address Resolution Protocol (ARP) must be performed. Alternatively, nodes can store a number of IP address/link-layer address mappings in a data table to determine a corresponding link-layer address. Specialized ARP and ICMP control and routing information packets are currently used to transmit link-layer addresses over a network so data tables can be updated. These specialized protocols have restrictions in their use on a network.

Having a simpler, more generic method of transmitting link-layer addresses in any information packet would be desirable and reduce overhead information message traffic. Moreover, an expanded address space over that available in IPv4 along with a link-layer address may be exploited to expand the application and utility of protocols at the link-layer level.

SUMMARY OF THE INVENTION

The invention is a Generalized Link-Layer Extension that can be included in the optional extension data fields of an information packet. This generalized extension of the present invention includes a type data field, a length data field, a sub-type data field, and a link-layer address data field. The link-layer address included in an information packet transmitted on a network with the extension indicates the physical connectivity of a node to the network.

The expanded 128-bit address field allows greatly increased link-layer address association. Expanded node-router associations are possible permitting wider application of link-layer protocols greatly simplifying hand-off procedures as a node changes connectivity. More advanced usage of link-layer protocols may evolve for communication between routers, correspondence nodes, mobile nodes, and neighbors across sub-network and network boundaries.

BRIEF DESCRIPTION OF THE DRAWINGS

The objects and features of the invention will become more readily understood from the following detailed description and appended claims when read in conjunction with the accompanying drawings in which like numerals represent like elements and in which:

DETAILED DESCRIPTION OF THE PREFERRED EMBODIMENTS

Figure 2:
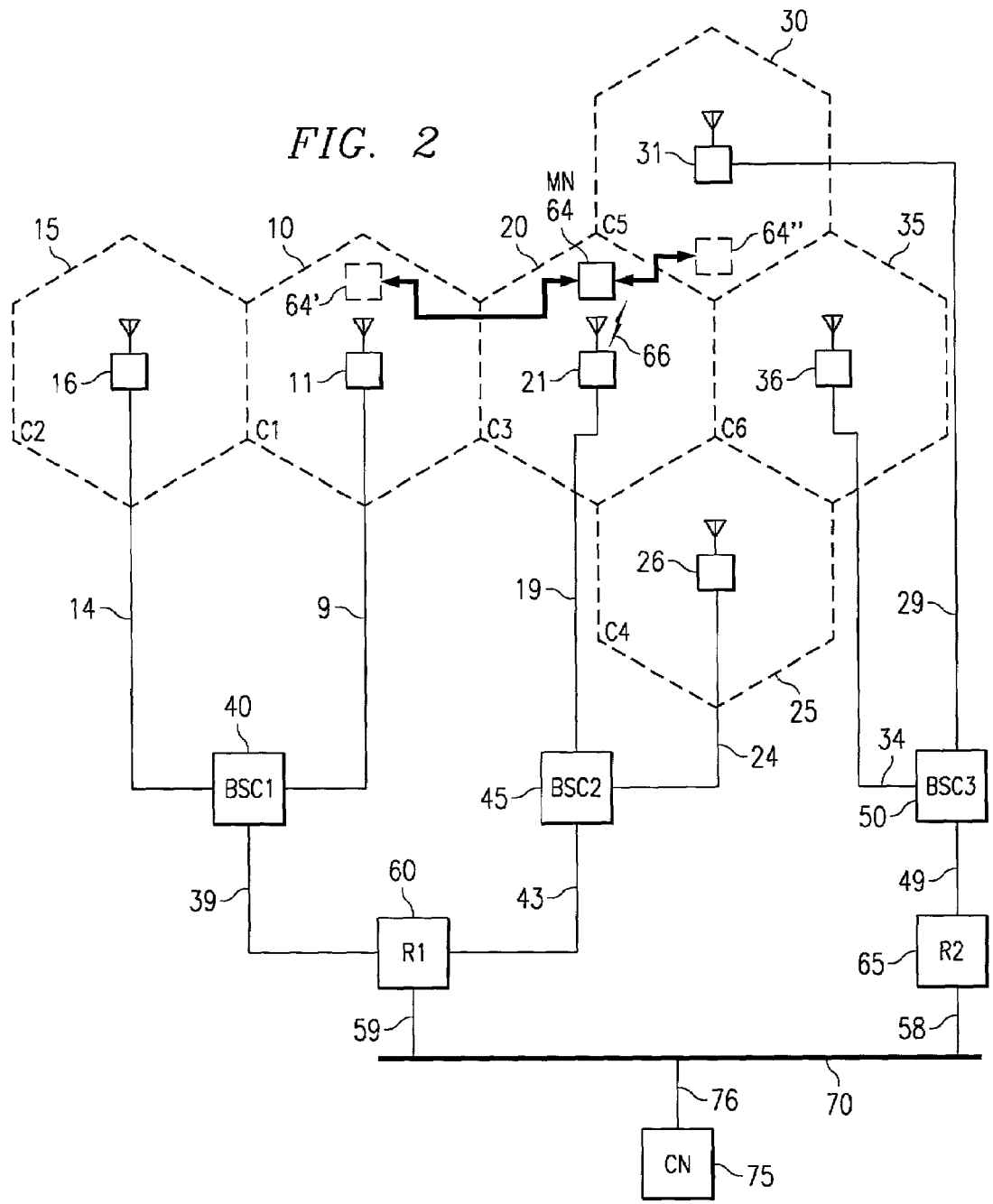
FIG. 2 is a prior art schematic diagram of a mobile IP wireless communication network.

FIG. 2 shows an embodiment for a mobile IP cellular communication network using the invention. Router 1 (R1) 60 is connected to a Base Station Controller 1 (BSC1) 40 by communication link 39. Base Station Controller BSC 1 40 is connected to a transceiver 11 by communication link 9. Transceiver 11 supports wireless communication in cell area 1 (C1) 10. Base Station Controller BSC 1 40 is also connected to transceiver 16 by communication link 14. Transceiver 16 supports wireless communication in cell area 2 (C2) 15.

Router R1 60 is connected to a second Base Station Controller 2 (BSC2) 45 by communication link 43. Base Station Controller BSC 2 45 is connected to transceiver 21 by communication link 19. Transceiver 21 supports communication in cell area 3 (C3) 20. Base Station Controller BSC 2 45 is also connected to transceiver 26 by communication link 24. Transceiver 26 supports communication in cell area 4 (C4) 25.

A second router, Router 2 (R2) 65 is connected to a Base Station Controller 3 (BSC3) 50 by communication link 49. The Base Station Controller BSC 3 50 is connected to transceiver 31 by communication link 29. Transceiver 31 supports wireless communication in cell area 5 (C5) 30. Base Station Controller BSC 3 50 is also connected to transceiver 36 by communication link 34. Transceiver 36 supports wireless communication in cell area 6 (C6) 35.

A Mobile Node (MN) 64 is located in cell area 3 (C3) 20. The Mobile Node MN 64 can be a communication device, such as a cellular phone, or a router or other type of host. Wireless communication link 66 links transceiver 21 to Mobile Node MN 64. Communication to and from Mobile Node MN 64 is controlled by Router R1 60. In FIG. 2, Mobile Node MN 64 is able to move from cell area 3 (C3) 20 to any adjoining cellular area—cell area 1 (C1) 10, cell area 4 (C4) 25, cell area 5 (C5) 30, or cell area 6 (C6) 35. Router R1 60 is connected to coupling 70 by communication link 59. Router R2 65 is connected to coupling 70 by communication link 58. Coupling 70 is a direct link between Router R1 60 and Router R2 65 on the same network.

Correspondence Node (CN) 75 is connected to coupling 70 by communication link 76, which is a direct, wired connection.

Nodes connected to the network have an assigned link-layer address representing the physical connection of the node to the network. Router R1 60 and Router R2 65 will have a fixed link-layer address. Mobile Node MN 64 will have a link-layer address assigned dependent upon its physical connectivity to transceiver 21. This connection and link-layer assignment is made upon power-up in cell area 3 (C3) 20. The IP address link-layer address association will be established and maintained in routing tables. As Mobile Node MN 64 moves across the cellular boundaries, its connectivity and link-layer address will change.

FIG. 2 shows two embodiments for movement of Mobile Node MN 64 to adjoining cell areas. The first is Mobile Node MN 64 moving from cell area 3 (C3) 20 to cell area 1 10, shown as Mobile Node MN 64'. Although this movement results in no change to Mobile Node MN 64 router association, its link-layer connectivity, and thus its designated link-layer address for that connectivity, changes. This requires a hand-off procedure involving an exchange of ICMP and/or control and routing messages between the router and Mobile Node MN 64' as well as an exchange of ARP messages on the network. The hand-off procedure will also update the various routing tables and other data tables maintaining the Mobile Node MN 64 IP-to-link-layer address association thereby ensuring the correct routing of information packets.

FIG. 2 also shows Mobile Node MN 64 moving from cell area 3 (C3) 20 to cell area 5 (C5) 30, shown as Mobile Node MN 64". This movement results in both a change in connectivity as well as a change in Mobile Node MN 64s router association from Router R1 60 to Router R2 65. Hand-off procedures involve assignment of a care-of address by Router R2 65 in an exchange of ICMP messages between MN 64" and Router R2 65.

Additionally, ARP messages will be transmitted to change or establish link-layer address associations for the Mobile Node MN 64" on the network, and Router R1 60 will also need to be updated with the care-of address for Mobile Node MN 64", which may include the link-layer address association. For both situations depicted by Mobile Node MN 64' and Mobile Node MN 64", the Correspondence Node CN 75 will need to continue communications. Correspondence Node CN 75 may maintain a data table with a link-layer address association for Mobile Node MN 64. This link-layer address association for Mobile Node MN 64 will also be established and updated by either ICMP or ARP control and routing messages.

Coupling 70 can also represent other alternative embodiments besides a direct connection between Router R1 60 and Router R2 65. Coupling 70 can also represent a communication link that includes another router on the same network. Coupling 70 can also represent a connection between two geographically separated sub-networks, interconnected by the Internet, with a server computer or router controlling movement of information packets between the remotely located routers, Router R1 60 and Router R2 65. Another possible embodiment is Router R1 60 and Router R2 65 occupying separate networks, with coupling 70 including routers and server computers on the Internet.

The communication link 76 between coupling 70 and Correspondence Node CN 75 can also be a wireless connection on a cellular system with Correspondence Node CN 75 also moving across cell areas. Communication link 76 can also include an Internet connection through a separate sub-network or network. In each of these alternative embodiments, Correspondence Node CN 75 will have an associated link-layer connectivity and a designated link-layer address.

The essential depiction in FIG. 2 is that Mobile Node MN 64 is switching its physical connectivity, and thus its link-layer address, as it moves across cell area boundaries. As Mobile Node MN 64 moves across cellular boundaries, there must be a mechanism for informing other nodes, including any neighboring nodes, routers, and correspondence nodes as well as Mobile Node MN 64, of the new link-layer address and establishing and updating these link-layer address associations. Moreover, other nodes may have an associated link-layer address for their physical connectivity to a network, and this connectivity may also be subject to change, such as in the case of a mobile router. Currently, establishing and updating these link-layer address associations requires specialized information packets transmitted on a network.

The specialized information packets currently used to establish and update link-layer address associations are processed to incorporate the link-layer address associations on data tables. In FIG. 2, the Mobile Node MN 64, Correspondence Node CN 75, Router R1 60, and Router R2 65 may maintain a data table associating each of the other nodes with a particular link-layer address. As Mobile Node MN 64 changes its connectivity, each of the nodes with a data table containing a link-layer address association for Mobile Node MN 64 needs to update the data table with the new link-layer address.

Other nodes may also need to establish or maintain a link-layer address association for Mobile Node MN 64. If Correspondence Node CN 75 changes its link-layer connection, data tables in other nodes must also be updated or established. If Router R1 60 and Router R2 65 change their link-layer connection, data tables in nodes and server computers will also need to be updated or established. Updating and establishing the various link-layer associations on nodes and server computers requires significant message and data overhead on a network. Using a generalized link-layer extension in an information packet to communicate these changes would reduce this overhead.

Figure 1:
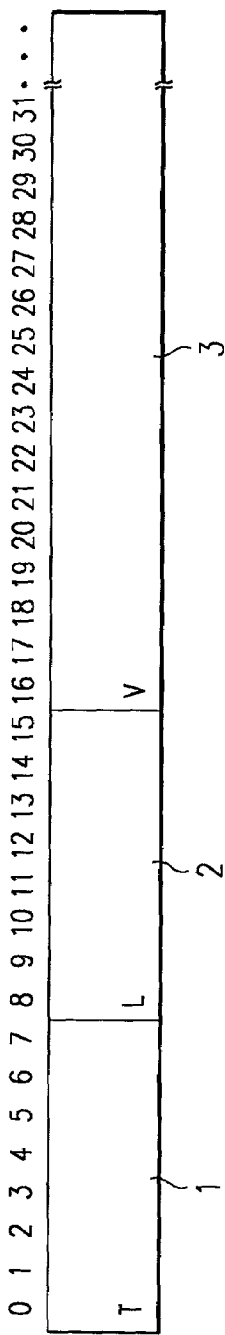
FIG. 1 is a general extension format.
Figure 3:
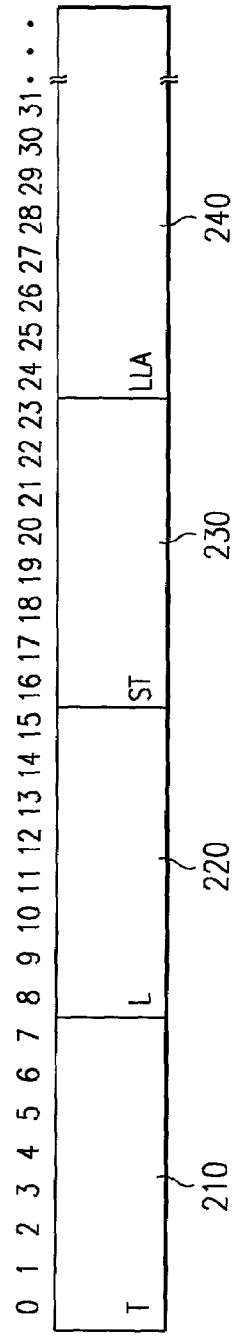
FIG. 3 is a general representation of the generalized link-layer address extension according to the invention.

FIG. 3 shows the format for the Generalized Link-Layer Address Extension (GLLA) of the invention, which follows the general format for an extension shown in FIG. 1. The first 8-bit data field is the Type field (T) 210, which the assigned value will designate the extension as a GLLA. The Length field (L) 220 is the next 8-bit data field, and the value will equal the length of the link-layer address, in octets, plus the 8-bit (one octet) Sub-Type field 230. The next 8-bit data field is the Sub-Type field (ST) 230, and this field will identify the sub-type of the link-layer address extension. The final data field is the link-layer address extension data field (LLA) 240, and this data field is variable in length.

Figure 4:
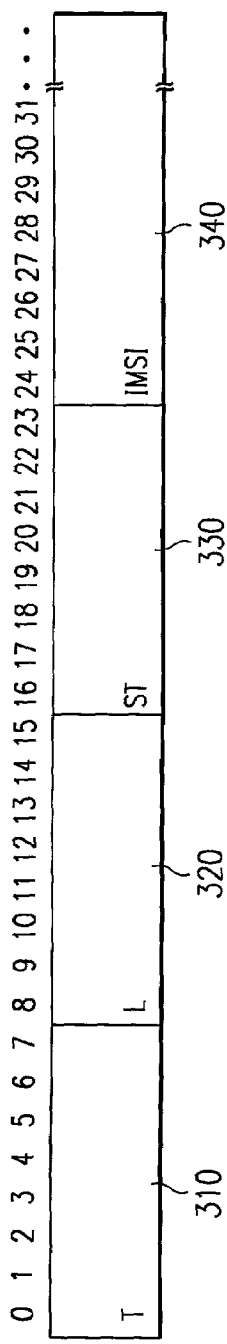
FIG. 4 is a general representation of a cdma2000 link-layer address extension according to the invention.

A number of link-layer address protocols or standards are utilized, and these need to be identified in the extension. Three specific sub-type embodiments for link-layer addresses are 1) the cdma2000 extension 2) the Ethernet extension, and 3) the Global Identifier extension. FIG. 4 shows the embodiment for the cdma2000 Link-Layer Address Extension Sub-Type. The T 310 field designates the extension as a GLLA. The L 320 will have a value equal to the length of the International Mobile Station Identifier (IMSI) field plus one-octet. The ST 330 field will have an assigned value designating the GLLA sub-type as a cdma2000 Link-Layer Address Extension. The extension will contain an IMSI address field 340. This field will be in the form of <IMSI>:<Connection ID>. The <IMSI> field contains an ASCII-based representation of the IMSI. The ":" is ASCII 0x3a, and the <Connection ID> is the ASCII representation of a small, decimal number used for distinguishing different link-layer connections from the same device.

Figure 5:
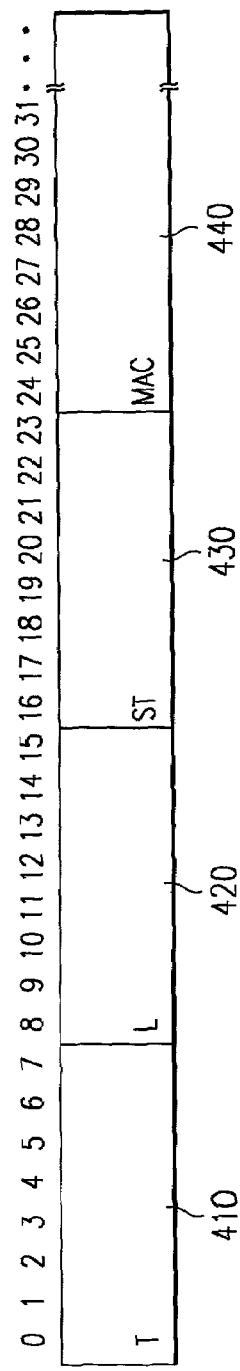
FIG. 5 is a general representation of an Ethernet link-layer address extension according to the invention.

FIG. 5 shows the embodiment for an Ethernet Link-Layer Address Extension sub-type GLLA. The T 410 occupies the first 8-bit field and designates the extension type as a GLLA. The L 420 8-bit field will have the length of the extension in octets plus one, which will be 7 (56 bits). The ST 430 8-bit field will identify the GLLA as an Ethernet Link-Layer Address Extension. The final address extension field 440 will contain the Ethernet Media Access Control (MAC) address 440, which is 48 bits long.

Figure 6:
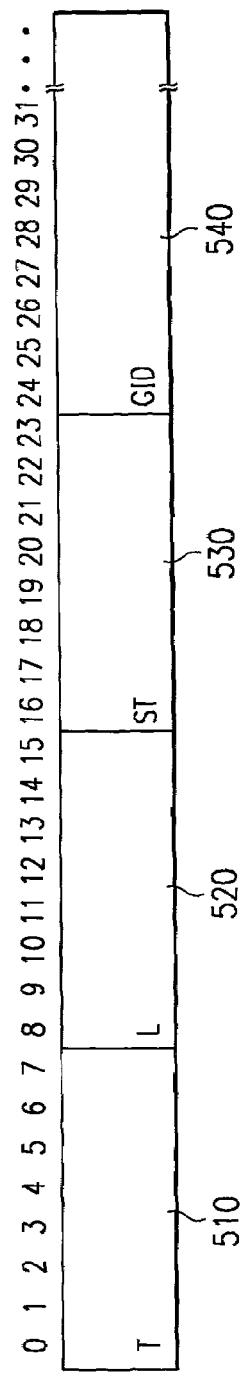
FIG. 6 is a general representation of a global identifier link-layer address extension according to the invention.

FIG. 6 shows the embodiment for a Global Identifier Link-Layer Address extension sub-type GLLA. The T 510 occupies the first 8-bit field and designates the extension type as a GLLA. The next 8-bit field L 520 has a value of 9. The ST 530 is 8-bits long and designates the sub-type as a Global Identifier (EUI-64) Address extension. The final data field 540 will contain an IEEE 64-bit Global Identifier (GID) (EUI-64) Address extension, which is 64 bits in length.

Looking at FIG. 2, the link-layer address association for Mobile Node MN 64' can be updated on Mobile Node MN 64', Router R1 60, and Correspondence Node CN 75 without using any specialized information packets. The generalized link-layer address extension can be contained in an information packet transmitting data to or from any node as part of an ongoing communication session. The same information packet can be processed by Mobile Node MN 64', Router R1 60, and Correspondence Node CN 75 to update a data table with a link-layer address. Router R1 60 can add the extension to an information packet to communicate the link-layer address change to Mobile Node MN 64', Correspondence Node CN 75, or some other node or server computer.

A specialized information packet, such as a notification message or routing message, can also be transmitted to update any nodes or server computers of the link-layer address change using the extension. Upon initial power-up these specialized information packets can also be used to register the Mobile Node MN 64 with Router R1 60 and any other node or server computers and establish data tables on these nodes, or server computers, with a link-layer address association for the Mobile Node MN 64, which can be later updated with any information packet containing the GLLA extension.

For MN 64" on FIG. 2, as the Mobile Node MN 64 moves across the cell area boundary to Mobile Node MN 64", link-layer address associations can be updated or established on a data table on a node using the GLLA extension in any information packet in the same manner utilized by Mobile Node MN 64'. Any transmitted information packet received by a node or server computer communicating with Mobile Node MN 64" or Router R2 65 can contain the extension and be processed to update a data table. Although specialized information packets may be utilized to update or establish a link-layer address association for the Mobile Node MN 64 at locations shown as Mobile Node MN 64, Mobile Node MN 64', and Mobile Node MN 64", the ability to use the extension in any type of information packet will permit and encourage further development and exploitation of link-layer addressing and routing protocols. Message traffic involving discovery, notification, control, or routing messages will be reduced freeing up network resources.

While the invention has been particularly shown and described with respect to preferred embodiments, it will be readily understood that minor changes in the details of the invention may be made without departing from the spirit of the invention.

Having described the invention, we claim:

1. A node connectable to a home network of a communication system, comprising:

a processor for receiving a plurality of associated link-layer addresses, each of said link-layer addresses designating a physical link-layer connection related to one of a plurality of nodes in a home network;

said node being adapted to communicate with a foreign network having a plurality of associated link-layer addresses, each of said link-layer addresses designating a physical link-layer connection between one of a plurality of mobile nodes and said foreign network, and being further adapted to communicate using an information packet that can comprise any one of a plurality of message types to update a data table entry on a plurality of nodes, said information packet including a generalized link-layer address extension that has a type data field, a length data field indicating the length of the link-layer address data field and a sub-type data field, the sub-type data field designating the link-layer address protocol used on the foreign network, and a link-layer address data field designating the link-layer address of the physical link-layer connection to at least one mobile node associated with said home network.

2. The node connectable to a home network of claim 1, wherein an assigned link-layer address for one of the mobile nodes changes as that mobile node moves to another network.

3. The node connectable to a home network of claim 1, wherein the information packet is transmitted by one of said networks to inform the mobile node of its assigned link-layer address on that network.

4. The node connectable to a home network of claim 1, wherein the information packet is transmitted by one of the mobile nodes to inform one of said networks of its assigned link-layer address.

5. The node connectable to a home network of claim 1, wherein the information packet informs a correspondence node of an assigned link-layer address.

6. The node connectable to a home network of claim 1, wherein a link-layer address is used to route information packets to one of said mobile nodes.

7. The node connectable to a home network of claim 1, wherein the link-layer sub-type further comprises a transmission protocol designation.

8. The node connectable to a home network of claim 1, wherein the link-layer sub-type further comprises a system type designation.

9. A method of communicating a physical connectivity on a first communication network comprising the steps of:

connecting a mobile node identified using an address associated with a home network to said first communication network through said physical connectivity designated by a link-layer address extension to an address associated with the network of the physical connectivity; and transmitting a first information packet on said first communication network, wherein said first information packet can comprise any one of a plurality of message types received at a plurality of nodes to update data table entries associated with said mobile node, and supporting a generalized extension containing said link-layer address, a sub-type data field identifier that specifies the link-layer addressing used on the first communication network, and a type data field designation identifying the extension as a link-layer address extension containing the link-layer address for the physical connectivity of said mobile node to said first communication network used for routing information packets to said physical connectivity.

10. The method of communicating a physical connectivity on a first communication network of claim 9, wherein the link-layer address is used to route a second information packet to the mobile node.

11. The method of communicating a physical connectivity on a first communication network of claim 9, wherein the mobile node receives the first information packet.

12. The method of communicating a physical connectivity on a first communication network of claim 9, wherein the mobile node transmits the first information packet.

13. The method of communicating a physical connectivity on a first communication network of claim 9, further comprising the steps of:

providing a second communication network linked to the first communication network; and receiving the first information packet at said second communication network to inform the second network about the physical connectivity of said mobile node.

14. The method of communicating a physical connectivity on a first communication network of claim 9, further comprising the steps of:

providing a correspondence node with a communication link to the mobile node; and receiving the first information packet at said correspondence node.

15. The method of communicating a physical connectivity on a first communication network of claim 9, further comprising the steps of:

providing a router on a communication network; and receiving the first information packet at said router.

16. The method of communicating a physical connectivity on a first communication system of claim 9, wherein the first information packet is processed to update a data table on a plurality of routers.

17. A node connectable to a communication network and capable of receiving an information packet transmission comprising:

the node being adapted to receive an information packet having a generalized link-layer address extension to a network address for routing information packets, said link-layer address extension includes a type data field, a length data field, a sub-type data field indicating association with a specific node of a plurality of nodes on said network, and a link-layer address data field, wherein said link-layer address data field provides the link-layer routing address information used to route information packets to the physical connectivity of said mobile node to the communication network; and said information packet can comprise any one of a plurality of message types exchanged between a plurality of nodes, and each said information packet supports an extension data format used to update stored information on the plurality of nodes with routing address information for a physical connectivity for at least one specified node.

18. The node connectable to a communication network and capable of receiving an information packet transmission of claim 17, wherein the link-layer address is used by the communication network to route information packets to the mobile node.

19. The node connectable to a communication network and capable of receiving an information packet transmission of claim 18, wherein the mobile node includes a correspondence node.

20. The node connectable to a communication network and capable of receiving an information packet transmission of claim 17, wherein a data table is updated with said link-layer address on a plurality of routers.

* * * * *